(12) United States Patent
Takei et al.

(10) Patent No.: US 7,427,206 B2
(45) Date of Patent: Sep. 23, 2008

(54) CARD CONNECTOR

(75) Inventors: Kazunori Takei, Tokyo (JP); Hirokazu Takahashi, Tokyo (JP); Hitoshi Kikuchi, Tokyo (JP)

(73) Assignee: DDK Ltd., Tokyo (JP)

( * ) Notice: Subject to any disclaimer, the term of this patent is extended or adjusted under 35 U.S.C. 154(b) by 0 days.

(21) Appl. No.: 11/736,940

(22) Filed: Apr. 18, 2007

(65) Prior Publication Data

US 2007/0249199 A1    Oct. 25, 2007

(30) Foreign Application Priority Data

Apr. 19, 2006    (JP)    ............................. 2006-115165

(51) Int. Cl.
*H01R 13/62*    (2006.01)
(52) U.S. Cl. .................... 439/159; 439/160; 439/630
(58) Field of Classification Search ................ 439/159, 439/152, 160, 630, 326
See application file for complete search history.

(56) References Cited

U.S. PATENT DOCUMENTS

| 5,051,101 | A |   | 9/1991 | Komatsu |        |
|-----------|---|---|--------|---------|--------|
| 5,275,573 | A | * | 1/1994 | McCleerey | 439/159 |
| 5,337,813 | A |   | 8/1994 | Ritter  |        |
| 5,928,017 | A | * | 7/1999 | Lan     | 439/159 |
| 6,027,350 | A | * | 2/2000 | Chen et al. | 439/159 |
| 7,011,537 | B1 | * | 3/2006 | Wu      | 439/159 |
| 7,066,748 | B2 | * | 6/2006 | Bricaud et al. | 439/159 |
| 7,112,075 | B1 | * | 9/2006 | Su      | 439/159 |
| 2004/0137793 | A1 |   | 7/2004 | Matsunaga |    |
| 2006/0240713 | A1 |   | 10/2006 | Kikuchi et al. |  |

FOREIGN PATENT DOCUMENTS

| DE | 29620575 U1 | 1/1998 |
| JP | 2003045562 A | 2/2003 |
| JP | 2006302684 A | 11/2006 |

OTHER PUBLICATIONS

European Communication. including an extended European search report. dated Jul. 23, 2007 for EP07251331, corresponding to the present application.

* cited by examiner

*Primary Examiner*—Hien Vu
(74) *Attorney, Agent, or Firm*—Abelman, Frayne & Schwab

(57) ABSTRACT

A card connector into and from which a memory card is detachably inserted and removed, includes contacts each adapted to contact a connection portion of the memory card, and a housing for arranging and holding the contacts and having an inserting opening for inserting the memory card. The housing includes two side walls, a rear wall, and a lower wall contiguous to these side and rear walls to form the inserting opening for the memory card by these walls. A shell is arranged on the side of the housing opposite from the lower wall, and an elastically deformable tray is arranged on the lower wall so as to be slidable with the aid of a tray restraining plate. The card connector is miniaturized and lighter, more compact and simple in construction and is easy to remove a memory card.

9 Claims, 5 Drawing Sheets

CARD CONNECTOR

BACKGROUND OF THE INVENTION

This invention relates to a card connector for use in a various electric and electronic appliances such as mobile phone, personal digital assistant (PDA), printers, card readers and the like for inputting and outputting signals into and from memory cards inserted into the card connector, and more particularly to a card connector having a structure for easily removing the memory card, while maintaining a reduced overall height of the card connector.

In recent years, with the wide spread use of digital cameras and the like, memory cards having a large memory capacity and a compact shape have been used. A wide variety of memory cards have also been used depending upon characteristics and the like of appliances with which the memory cards are used, for example, SD card (Secure Digital memory card, registered trademark, referred to hereinafter just as "SD card"), Memory Stick card (registered trademark, referred to hereinafter just as "MS card"), SmartMedia card (registered trademark, referred to hereinafter just as "SM card"), CompactFlash card (registered trademark, referred to hereinafter just as "CF card"), xD card (registered trademark, referred to hereinafter just as "xD card"), Multimedia card (registered trademark, referred to hereinafter just as "MM card"), and the like. Accordingly as devices for writing and reading onto and from these various memory cards, memory card reader writers are increasingly being used in computers themselves or as peripheral devices.

Examples of card connectors are disclosed in Japanese Patent Application Opened No. 2003-45,562 (push-push type card connector, Patent Literature 1) and Japanese Patent Application No. 2005-123,252 (card connector using a tray, Patent Literature 2).

Patent Literature 1

According to the abstract of the Japanese Patent Application Opened No. 2003-45,562, this invention has an object to provide an IC card inserting and removing device into which an IC card is detachably inserted. Disclosed is an IC card inserting and removing device adapted to be incorporated in an electronic appliance, including a housing 100 and a cover 200 covering the housing 100 consisting of a frame portion 110 in the form of a substantially U-shape and a bottom surface 120 closing one side of the frame portion 110 whose opposed lengthwise frame portions 111a and 111b are formed in their inside surfaces with guide grooves 113, and contacts 130 for IC card arranged in a bottom frame portion 111c, wherein a locking and ejecting mechanism 300 for IC cards is incorporated in one of the lengthwise frame portions 111a and 111b, thereby providing a superior card inserting and removing device which achieves miniaturization and simplification of used parts and enables an IC card to be stably held.

Incidentally, claim 1 of claims recites an IC card inserting and removing device to be incorporated in an electronic appliance, including a housing and a cover for covering the housing consisting of a frame portion in the form of a substantially U-shape and a bottom portion for reinforcing the frame portion, said frame portion having opposed lengthwise frame portions formed in their inner surfaces with guide grooves for the IC card, and contacts for IC cards arranged in a bottom frame portion perpendicularly crossing said lengthwise frame portions, wherein said device incorporates therein an IC card locking and ejecting mechanism comprising a slider provided on at least one of said lengthwise frame portions and advancing and retracting in the same directions of the movements of said IC card upon its insertion and removal, pushing means for always pushing said slider toward the card inserting opening of said guide grooves for the IC card, a cam groove provided in said slider and being in the form of a substantially heart-shape, and a rockable spring pin having a free end engaging in said cam groove and the other end fixed to said bottom frame portion. Claim 2 recites the IC card inserting and removing device as claimed in claim 1, whose slider has an inclined surface portion against which a corner oblique portion of an IC card abuts. Claim 3 recites the IC card inserting and removing device as claimed in claim 1 or 2, whose slider is adapted to slidably moved along guide rods provided on said lengthwise frame portions. Claim 4 recites the IC card inserting and removing device as claimed in claim 1, 2 or 3, whose lengthwise frame portion not incorporating said IC card locking and ejecting mechanism is provided with a metal fitting having an elastic pressing piece elastically extending in the guide groove for the IC card so as to press the side face of the IC card. Claim 5 recites the IC card inserting and removing device as claimed in claim 1, 2, 3 or 4, whose part of said cover is provided with an elastic pressing piece for pressing the surface of the IC card.

Patent Literature 2

According to the abstract of the Japanese Patent Application No. 2005-123,252, the object of this invention is to provide a card connector 10 enabling a reduced overall height of the connector with a simple construction, and this object can be achieved by a card connector 10 adapted to be connected to at least two cards 60 and including contacts 14 corresponding to the number of the cards 60, a tray 16 in which at least two cards 60 can be located, and a housing having a fitting opening 20 for receiving the tray 16 and arranging and holding said contacts 14. As a card connector 10 adapted to be connected to four cards 60, disclosed is a card connector including contacts 14 of four kinds, a tray 16 having a card mounted or loading portion 22 into which the four cards 60 can be worn or loaded, and a housing 12 for arranging and holding the contacts 14 of four kinds and having a fitting opening 20 for receiving the tray 16.

Incidentally, claim 1 recites a card connector being connected to at least two cards, comprising contacts corresponding to the number of said cards, a tray into which at least two cards can be loaded, and a housing having a fitting opening for receiving said tray and arranging and holding said contacts. Claim 2 recites a card connector being connected to four card, comprising contacts of four kinds, a tray having a card loading portion into which the four cards can be loaded, and a housing for arranging and holding said contacts of four kinds and having a fitting opening for receiving said tray. Claim 3 recites the card connector as claimed in claim 1 or 2, wherein said tray is provided with the card loading portion having one part overlapping in relation to kinds of card other than one kind of card intended to be loaded in the card loading section so as to allow the intended one kind of card only to be loaded in the card loading portion. Claim 4 recites the card connector as claimed in claim 1 or 2, wherein said tray is provided with the card loading portion not having a part overlapping in relation to at least two kinds of cards so as to allow at least two kinds of cards to be loaded in the card loading portion and said tray is further provided with a card identification mechanism for identifying the cards to be used. Claim 5 recites the card connector as claimed in claim 1, 2, 3 or 4, wherein said housing is provided with stopper means on the side of the fitting opening for preventing the tray from extending from the housing. Claim 6 recites the card connector as claimed in any one of claims 1 to 5, further comprising a mechanism for drawing said tray to some extent relative to the housing by pushing said tray in the state that said tray has been inserted.

Recently, with the miniaturization of appliances, the need for connectors to be more miniaturized has become stronger. On the other hand, as the connector becomes lighter and more compact, it becomes difficult to insert and remove a memory card into and from the connector. Under such circumstances, the connector constructed as disclosed in the Patent Literature 1 could not realize the miniaturization of the connector. On the other hand, the card connector of the tray type as disclosed in the Patent Literature 2 has a problem that removal of a memory card from the tray would be difficult after the tray has been drawn from the connector.

As a general trend of the technical field, a requirement for preventing erroneous fitting of memory cards has become stronger.

SUMMARY OF THE INVENTION

In view of these problems of the prior art, the invention has an object to provided a card connector which is simple, and lighter and more compact in construction, and is easy to remove a memory card.

The above object can be achieved by a card connector 10 into and from which a memory card 60 is detachably inserted and removed, including contacts 14 each adapted to contact a connection portion of the memory card 60, and a housing 12 for arranging and holding said contacts 14 and having an inserting opening 22 for inserting the memory card 60, in that according to the invention said housing 12 comprises two side walls 24, a rear wall 26, and a lower wall 28 contiguous to these side and rear walls 24 and 26 to form said inserting opening 22 for said memory card by said two side walls 24, said rear wall 26, and said lower wall 28, and that a shell 16 is arranged on the side of said housing 12 opposite from said lower wall 28, and an elastically deformable tray 18 is arranged on said lower wall 28 so as to be slidable with the aid of a tray restraining plate 20.

According to the card connector 10 as claimed in claim 2, said tray 18 is made of a metal having an elasticity in the form of a plate and comprises at one free end an operating portion 36 extending from the end face of said lower wall when said memory card has been worn so that said tray 18 is slidably moved by drawing said operating portion 36.

According to the card connector 10 as claimed in claim 3, moreover, said tray 18 comprises erroneous fitting preventing means and positioning means for said memory card.

According to the card connector 10 as claimed in claim 4, said tray 18 is formed as a plate-shaped piece so that a space is provided below the lower surface of said memory card 60 when said tray 18 has been drawn from the housing.

As can be seen from the above description, the card connector 10 according to the invention has the following significant functions and effects.

(1) In a card connector 10 into and from which a memory card 60 is detachably inserted and removed, including contacts 14 each adapted to contact a connection portion of the memory card 60, and a housing 12 for arranging and holding said contacts 14 and having an inserting opening 22 for inserting the memory card 60, according to the invention said housing 12 comprises two side walls 24, a rear wall 26, and a lower wall 28 contiguous to these side and rear walls 24 and 26 to form said inserting opening 22 for said memory card by said two side walls 24, said rear wall 26, and said lower wall 28, and further a shell 16 is arranged on the side of said housing 12 opposite from said lower wall 28, and an elastically deformable tray 18 is arranged on said lower wall 28 so as to be slidable with the aid of a tray restraining plate 20. According to the invention, therefore, it is possible to provide a lighter and more compact card connector, for example, having a thickness of less than 1.8 mm, and being capable of easily removing said memory card 60.

In the card connector 10 as claimed in claim 2, according to the invention said tray 18 is made of a metal having an elasticity in the form of a plate and comprises at one free end an operating portion 36 extending from the end face of said lower wall when said memory card has been worn so that said tray 18 is slidably moved by drawing said operating portion 36. Consequently, it is possible to provide a lighter and more compact card connector and being capable of easily removing said memory card 60 because said tray 18 is made of a metal having an elasticity.

In the card connector 10 as claimed in claim 3, according to the invention said tray 18 comprises erroneous fitting preventing means and positioning means for said memory card. Therefore, any erroneous fitting of the memory card 60 can be prevented, and the sliding movement of the said tray 18 can be suitably limited. Moreover, the height of said memory card 60 is held constant so that the memory card can be stably held even during sliding movement of the tray.

In the card connector 10 as claimed in claim 4, according to the invention said tray 18 is formed as a plate-shaped piece so that a space is provided below the lower surface of said memory card 60 when said tray 18 has been drawn from the housing. Accordingly, said memory card can be readily removed even with the lighter and more compact card connector.

The invention will be more fully understood by referring to the following detailed specification and claims taken in connection with the appended drawings.

DESCRIPTION OF THE PREFERRED EMBODIMENTS

Figure 1A:
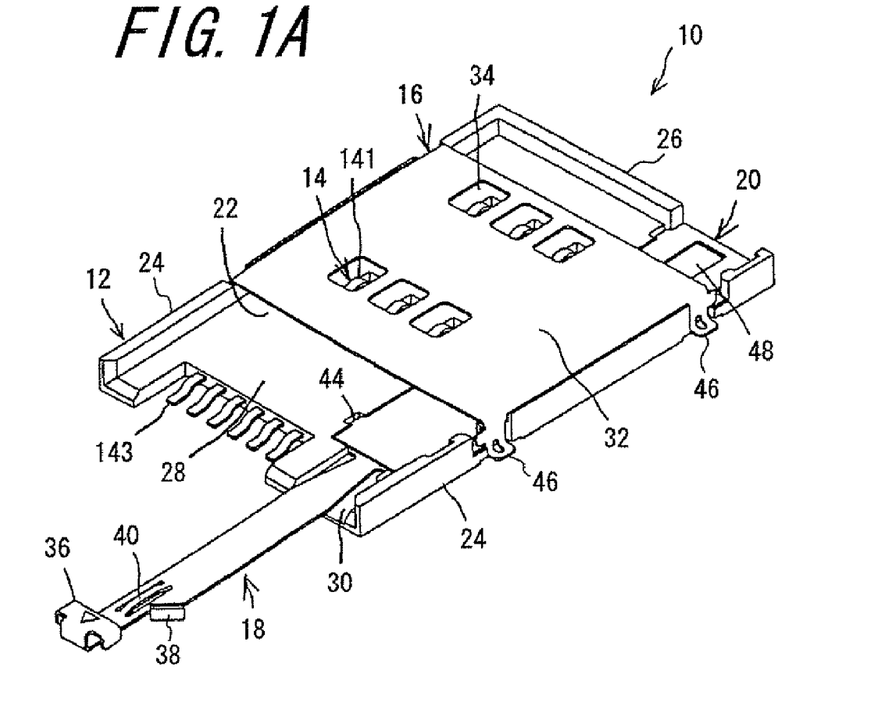
FIG. 1A is a perspective view of the card connector with a tray drawn, viewed from the fitting side.
Figure 1B:
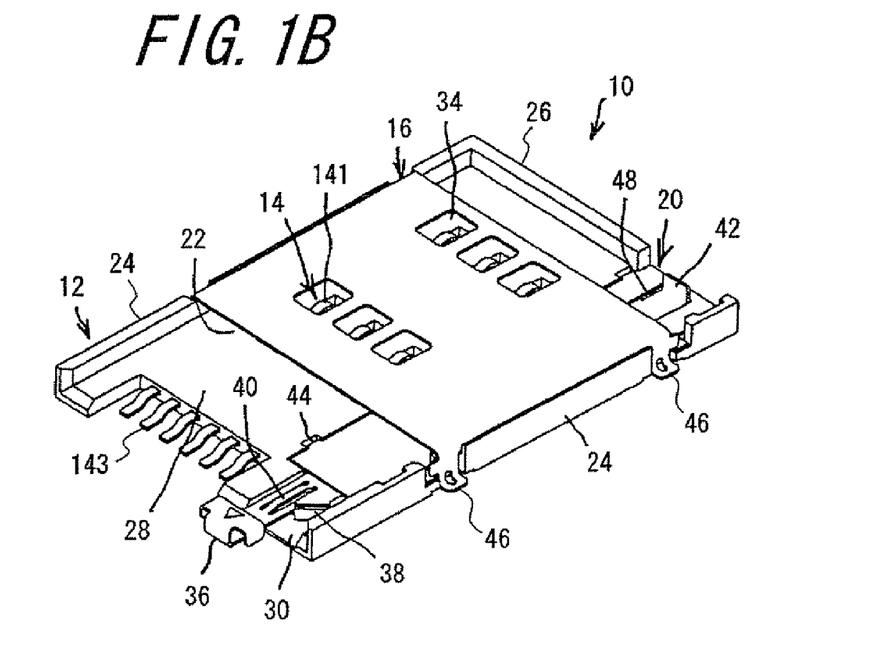
FIG. 1B is a perspective view of the card connector with a tray completely inserted, viewed from the fitting side.
Figure 2A:
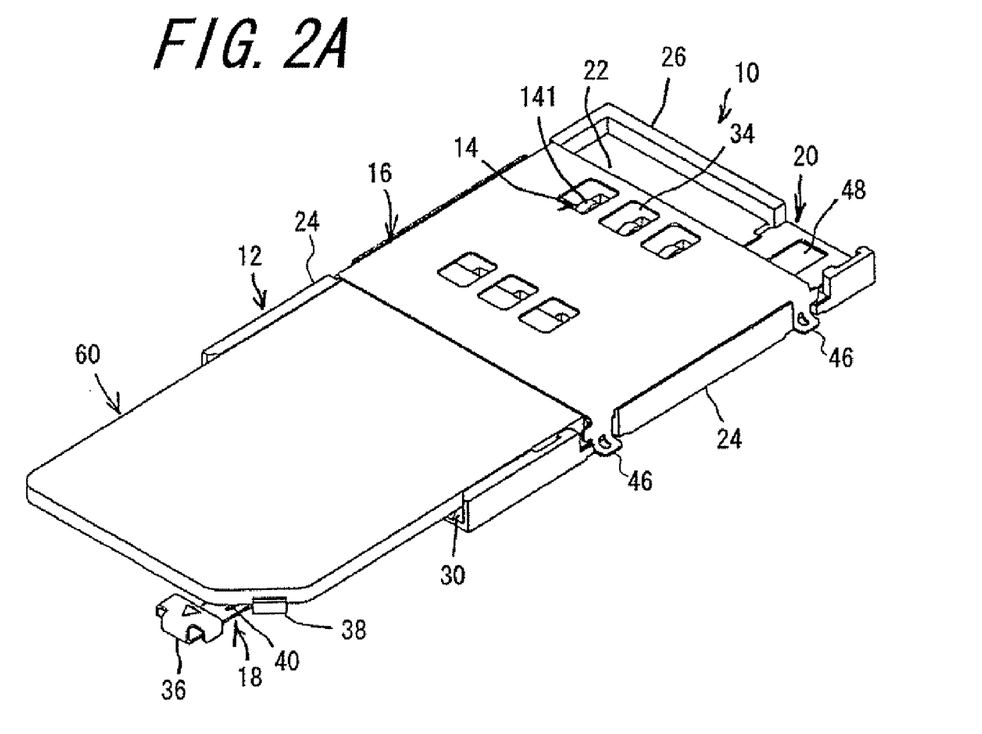
FIG. 2A is a perspective view of the card connector with the tray drawn and a card mounted or worn on the tray, viewed from the fitting side.
Figure 2B:
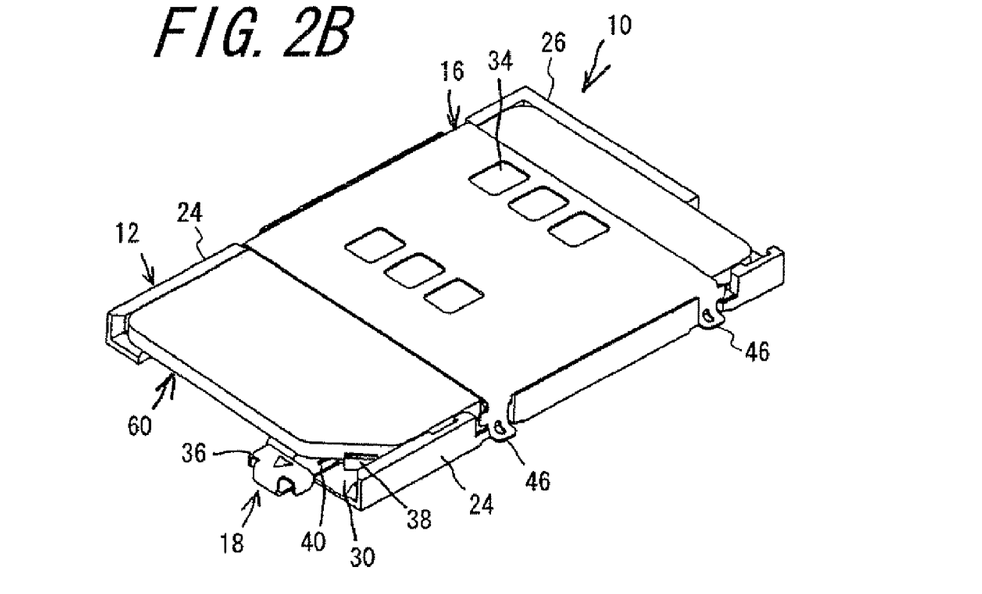
FIG. 2B is a perspective view of the card connector with the card mounted and the tray inserted, viewed from the fitting side.
Figure 3:
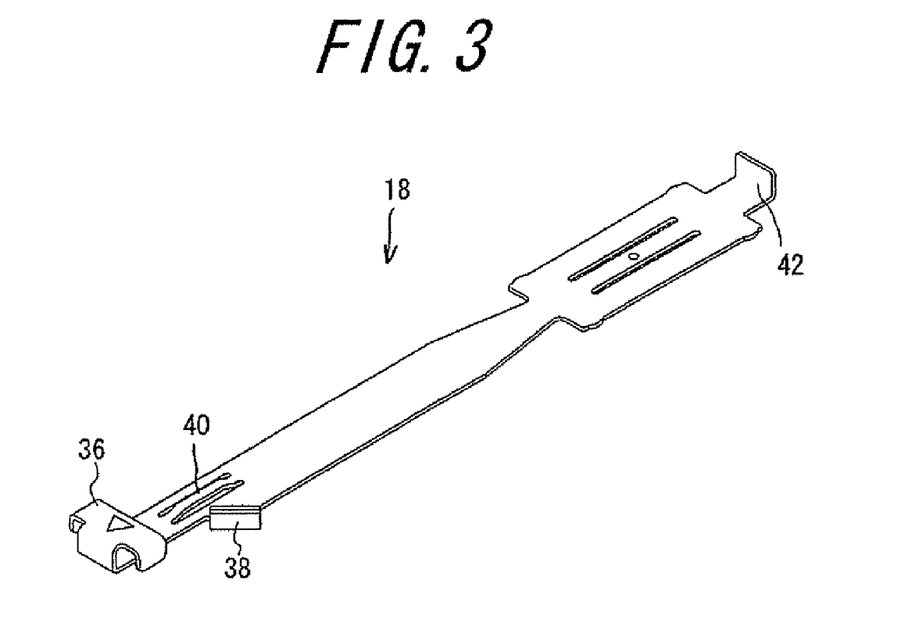
FIG. 3 is a perspective view of the tray.
Figure 4:
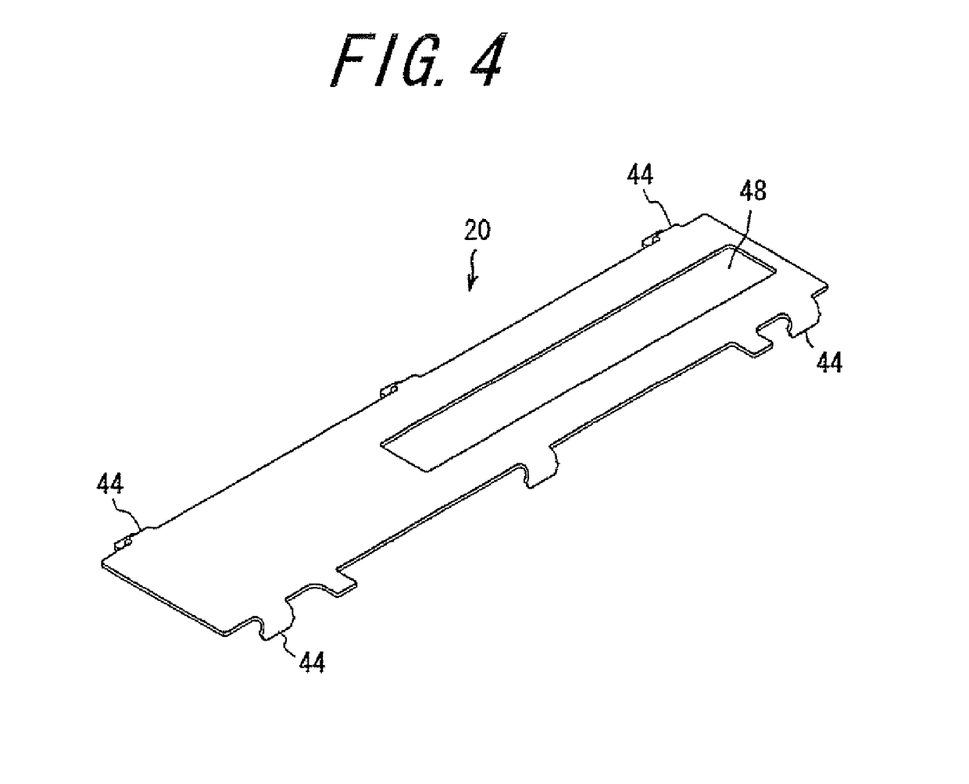
FIG. 4 is a perspective view of a tray restraining plate.
Figure 5:
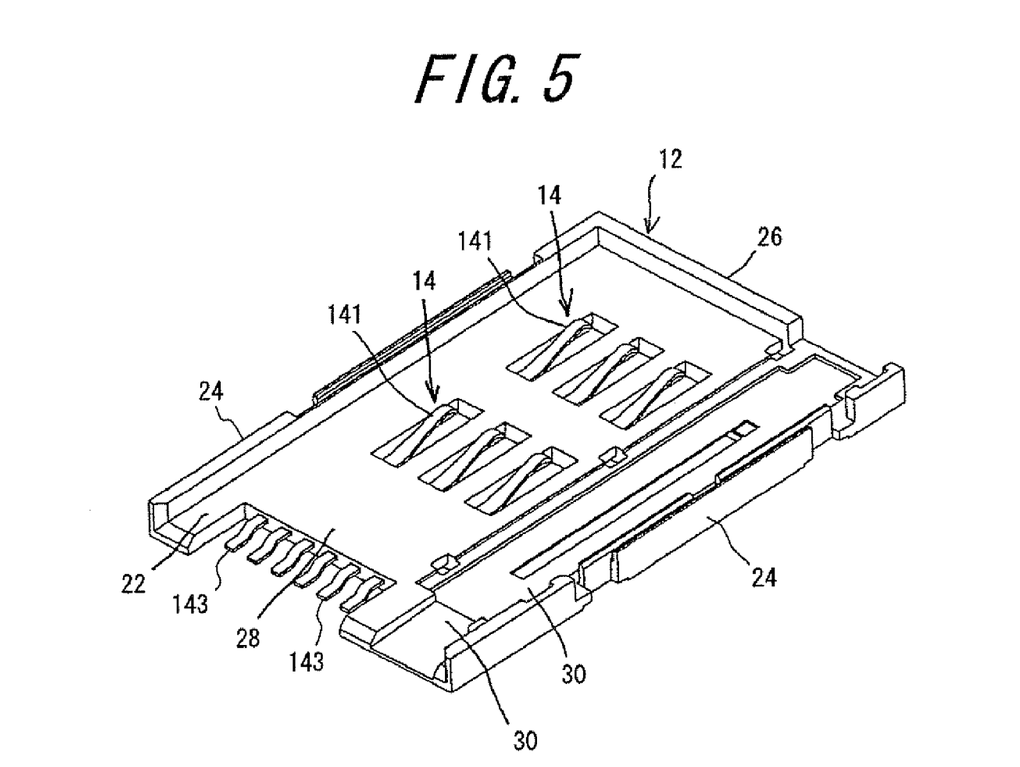
FIG. 5 is a perspective view of a housing with contacts held therein.
Figure 6:
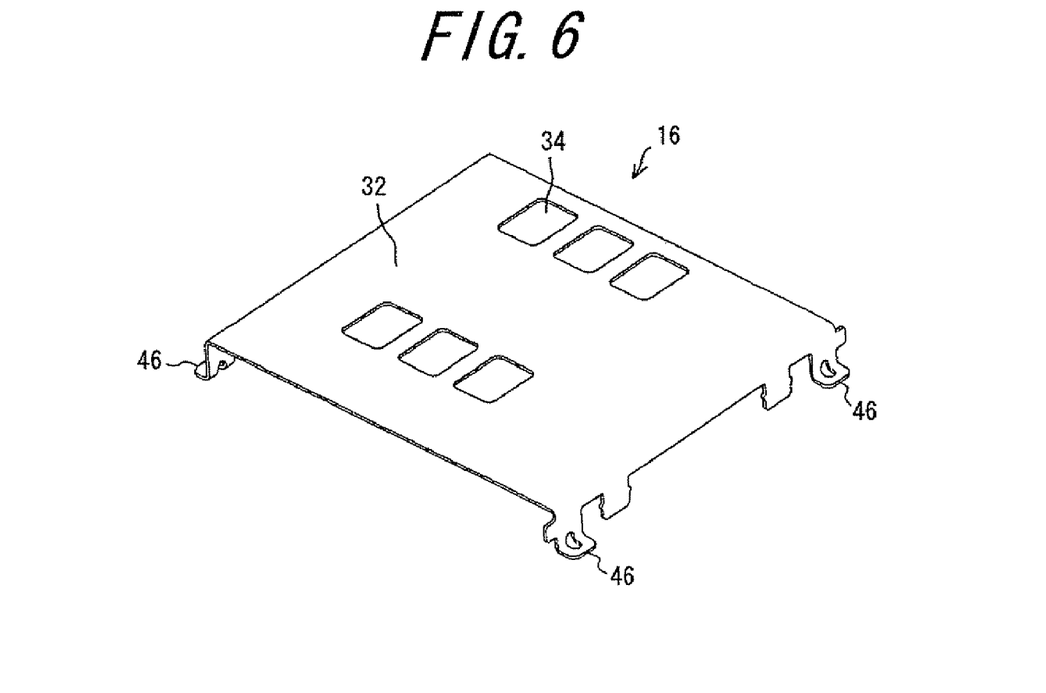
FIG. 6 is a perspective view of a shell.
Figure 7:
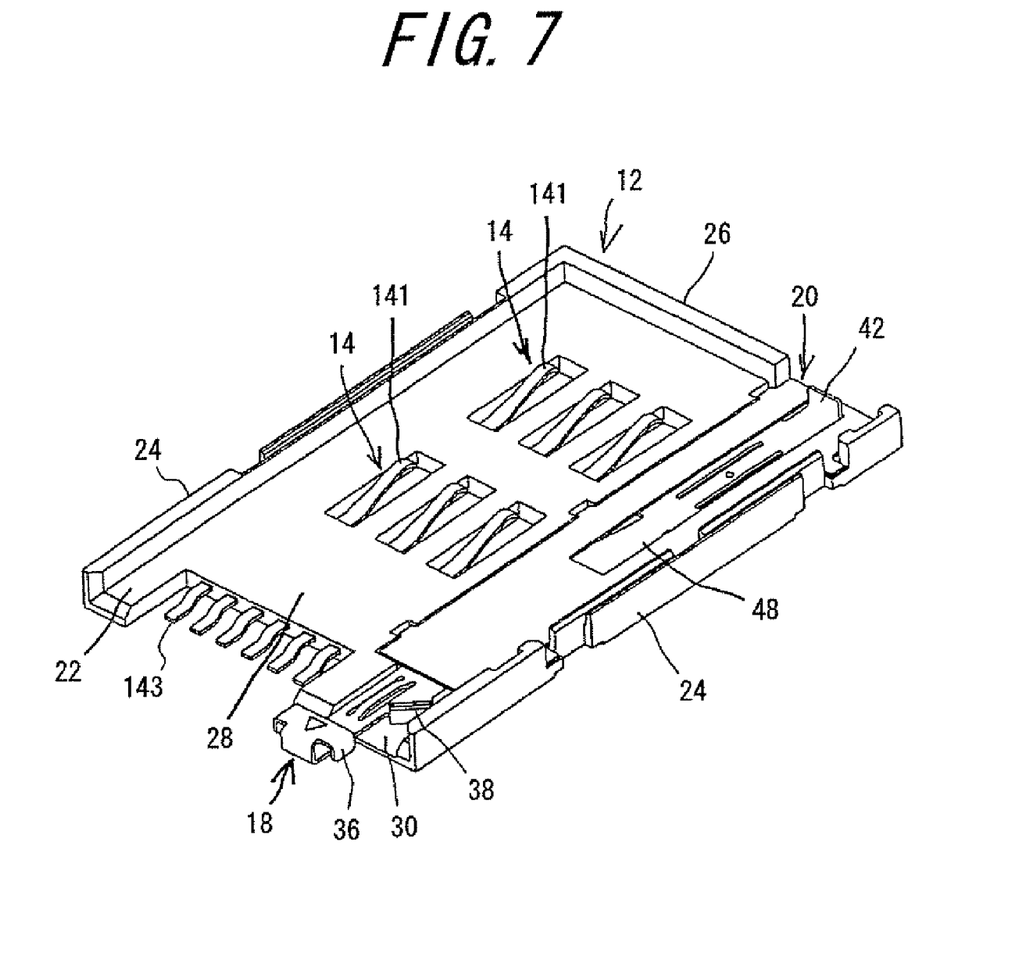
FIG. 7 is a perspective view of the card connector with the shell removed.

One embodiment of the card connector according to the invention will be explained with reference to FIG. 1A to 7. FIG. 1A is a perspective view of the card connector with a tray drawn, viewed from the fitting side, and FIG. 1B is a perspective view of the card connector with a tray completely inserted, viewed from the fitting side. FIG. 2A is a perspective view of the card connector with the tray drawn and a card worn on the tray, viewed from the fitting side, while FIG. 2B is a perspective view of the card connector with the card worn and the tray inserted, viewed from the fitting side. FIG. 3 is a perspective view of the tray, while FIG. 4 is a perspective view of a tray restraining plate. FIG. 5 is a perspective view of a housing with contacts held therein, and FIG. 6 is a perspective view of a shell. FIG. 7 is a perspective view of the card connector with the shell removed.

The card connector 10 of the one embodiment according to the invention mainly comprises the housing 12, the contacts 14, the tray 18, the shell 16, and the tray restraining plate 20.

Before explaining the components of the card connector, the cards will be explained. Said cards are used for printers, card readers and the like. Said cards each mainly comprise contact portions adapted to contact the contact portions 141 of the contacts 14, patterns connecting from the contact portions of the card to circuits, and connection portions adapted to be connected to integrated circuits and central processing units mounted on the patterns. Cards to be used for the card connector 10 according to the invention include SIM card (Subscriber Identity Module card, registered trademark), Multimedia card (registered trademark), SD card (Secure Digital memory card, registered trademark), Mini-SD card (Mini Secure Digital memory card, registered trademark), Memory Stick card (registered trademark), SmartMedia card (registered trademark), CompactFlash card (registered trademark), xD card (registered trademark), RS-MMC card (Reduce Size MMC card, registered trademark), Transflash card (registered trademark), S card (registered trademark), Memory-stick Duo card (registered trademark) and the like, these being IC cards having built-in CPU or IC for memory.

The card connector 10 of the illustrated embodiment is so constructed that the SIM card (registered trademark) can be inserted.

First, the tray 18 will be explained which is a subject matter of the invention. In the illustrated embodiment, the tray 18 is made of a metal and formed by means of the press-working of the known technique. Preferred metals from which to form said tray 18 include brass, beryllium copper, phosphor bronze, stainless steel and the like which comply with the requirements as to dimensional stability, formability, springiness, and the like. Particularly, the tray 18 must necessarily have an elasticity.

Said tray 18 serves to hold said memory card and to insert and remove it into and from the housing 12. Said tray 18 is a substantially plate-shaped piece and comprises an operating portion 36 at one end for drawing said tray 18 from the housing 12, an anchoring portion 42 at the other end adapted to engage said tray restraint plate 20 when said try has been completely drawn (the anchoring portion 42 also serves as positioning means), and erroneous fitting preventing means and positioning means (for holding the height of a card constant) at predetermined positions between said anchoring portion 42 and said operating portion 36.

Said operating portion 36 at the one end of the tray has a substantially U-shaped cross-section by bending. Said operating portion 36 is grasped by fingers to draw the tray 36 from the housing 12 for the purpose of removing said memory card 60 from the card connector, and the operating portion 36 somewhat extends from the front end of the inserting opening 22 of the housing 12 in the state that said memory card 60 has been inserted or worn in the card connector. The shape and size of the operating portion 36 may be suitably designed in consideration of these functions, strength and workability of the tray and miniaturization of the card connector, Said anchoring portion 42 at the other end of the tray 18 is substantially L-shaped by bending. Said anchoring portion 42 slidably engages in a groove 48 of said tray restraining plate 20 and serves to limit the distance of sliding movement of said tray 18 (or serves to position the tray 18). In other words, when the memory card 60 has been completely inserted or loaded, the anchoring portion 42 contacts the end of said groove 48 at its rear end to prevent the tray 18 from further advancing inwardly of the housing. On the other hand, when the tray is drawn for removing said memory card from the card connector, the anchoring portion 42 contacts the opposite end of said groove 48 to prevent the tray 18 from further being drawn toward the inserting opening 22 of the housing 12. The shape and size of said anchoring portion 42 may be suitably designed to fulfill such functions and in consideration of the functions, strength, workability and the like of the anchoring portion 42.

As described above, said tray 18 is provided with the erroneous fitting preventing means and the positioning means. As the erroneous fitting preventing means in the illustrated embodiment, an erroneous fitting preventing nail 38 having a substantially triangular cross-section is provided by bending so as to match in size an inclined face of the SIM card (registered trademark) 61 and at a location along the inclined face of the SIM card. The position and the size of the erroneous fitting preventing nail 38 may be suitably designed in consideration of the size of the SIM card (registered trademark) 61 and in a manner not scratching the memory card. Needless to say, said erroneous fitting preventing means will be suitably designed depending upon kinds of memory cards to be worn. The size of the erroneous fitting preventing nail 38 may be suitably designed in consideration of such functions, strength, workability, avoidance of scratching of the memory card, and the like.

As said positioning means in the illustrated embodiment, there is provided an engaging projection 40 extending from the upper surface of the tray and located on the side of the inserting opening 22 in the proximity of said operating portion 36 and said erroneous fitting preventing nail 38 for the purpose of holding said memory card 60 at a constant height when it has been loaded on said tray 18. The position, shape and size of said engaging projection 40 may be suitably designed in consideration of the balancing upon insertion of said memory card 60, and strength, workability and the like of said tray 18. The extending height of said engaging projection 40 is so determined that the top of said engaging projection 40 is flush with the surface of the lower wall 28 of said housing 12 in consideration of balancing when the tray 18 is in sliding movement.

As said tray 18 is formed in a plate-shaped piece so that a space is provided below the lower surface of said memory card 60 upon the tray being drawn, thereby enabling said memory card 60 to be readily grasped by fingers.

The tray restraining plate 20 will then be explained. The tray restraining plate 20 in the illustrated embodiment is made of a metal and formed by means of the press-working of the known technique, Preferred metals from which to form said tray restraining plate 20 generally include brass, beryllium copper, phosphor bronze, stainless steel and the like which comply with the requirements as to dimensional stability, formability, springiness, strength, and the like. However, an electrically insulating plastic material may be used for the tray restraining plate 20 insofar as it comply with the requirements such as the strength and its function described below.

Said tray restraining plate 20 is of substantially plate-shaped piece and is fixed to said housing 12 by means of press-fitting and the like. Said tray restraining plate 20 is formed with the groove 48 for limiting the sliding movement of said tray 18. The shape and size of said groove 48 may be suitably designed in consideration of ability of limiting the sliding movement of the tray, miniaturization of the connector, and strength, workability, facility of assembling and the like of the tray restraining plate 20. Said tray restraining plate 20 is provided with a required number of holding portions 44 for fixing the tray restraining plate 20 to said housing 12.

The housing 12 will then be explained. The housing 12 is formed from an electrically insulating plastic material by means of the injection molding of the known technique. The materials for the housing 12 may be suitably selected in consideration of dimensional stability, workability, manufacturing cost, and the like and generally include polybutylene terephthalate (PBT), polyamide (66PA or 46PA), liquid crystal polymer (LCP), polycarbonate (PC) and the like and combination thereof.

Said housing 12 comprises two side walls 24, a rear wall 26 and a lower wall contiguous to these side and rear walls 24 and 26. The inserting opening 22 for said memory card 60 is formed by the two side walls 24, the rear wall 26 and the lower wall 28.

As described above, said housing 12 is provided with the inserting opening 22 for inserting the memory card 60. In the illustrated embodiment, the inserting opening is so constructed that the SIM card (registered trademark) 61 can be inserted. Therefore, said inserting opening 22 has the shape and size to match the SIM card (registered trademark).

Moreover, the contacts 14 corresponding to the card 61 to be inserted are installed in said housing 12 and fixed to the housing 12 by integral molding (molding the housing together with the contacts previously arranged in a mold), press-fitting, hooking (lancing), welding or the like. In the illustrated embodiment, the contacts are fixed to the housing 12 by integral molding.

Said tray 18 serves to hold said memory card and to insert and remove it into and from the housing 12. Said tray 18 is a substantially plate-shaped piece and comprises an operating portion 36 at one end for drawing said tray 18 from the housing 12, an anchoring portion 42 at the other end adapted to engage said tray restraint plate 20 when said tray has been completely drawn (the anchoring portion 42 also serves as positioning means), and erroneous fitting preventing means and positioning means (for holding the height of a card constant) at predetermined positions between said anchoring portion 42 and said operating portion 36.

In the illustrated embodiment, said housing 12 is formed with a notch in which the connection portions 143 of said contacts 14 extend, in consideration of the miniaturization of the connector.

The contacts 14 will then be explained. The contacts 14 is made of a metal and formed by means of the press-working of the known technique. Preferred metals from which to form said contacts 14 include brass, beryllium copper, phosphor bronze and the like which to comply with the requirements as to springiness, electric conductivity, and the like.

Said contacts 14 each mainly comprise a contact portion 141 adapted to contact a connection portion of a memory card, a fixed portion 142 (not shown) to be fixed to said housing 12, and a connection portion 143 to be connected to a substrate. Said contacts 14 are compatible with the SIM card (registered trademark) 61.

The connection portions 143 of the contacts 14 may be suitably designed in consideration of circuit design and occupied area of the substrate, and the size and design of the connector 10. In the illustrated embodiment, the contacts 14 are provided so that their connection portions 143 extend on the side of the inserting opening 22 and the connection portions 143 are of a surface mounting type (SMT) as shown in FIGS. 1A and 1B.

Moreover, the contact portions 141 of the contacts 14 extend into said inserting opening 22 so as to contact the inserted memory card 60. The positions of said contact portions 141 may be suitably designed in consideration of the positions of the connection portions of the memory card 60 to be inserted. The extending distance of the contact portions 141 may be suitably designed in consideration of contact pressure against the memory card 60.

Finally, the shell 16 will be explained. The shell 16 is made of a metal and formed by means of the press-working of the known technique. Preferred metals from which to form said shell 16 include brass, beryllium copper, phosphor bronze, stainless steel and the like which comply with the requirements as to workability, soldability, and the like.

Said shell 16 has a substantially U-shaped cross-section and has functions for holding the memory card, preventing the memory card 60 from floating, ensuring the stability upon the card contacting, and securely fixing said card connector 10 to the substrate. Said shell 16 is formed with holes 34 for identifying the contact portions 141 of said contacts 14.

If required, farther, switch structures may be provided for confirming insertion and removal of the card 60. In more detail, a plurality of terminals are provided to enable the insertion and removal of the cards to be recognized by ON and OFF of the terminals.

In the illustrated embodiment, the card connector 10 has been shown and explained, having the structure into which the SIM card (registered trademark) 61 can be inserted. Needless to say, constructions similar to that described above according to the invention are also applicable to connectors for memory cards other than the SIM card.

Examples of applications of the present invention include card connectors being capable of exchanging signals between the connector and a memory card inserted in the connector for use in various electric and electronic appliances such as mobile phone, PDA (personal digital assistant), printers, card readers and the like, and particularly card connectors with a structure being easy to remove a memory card inserted therein while maintaining a reduced overall height of the connector.

While the invention has been particularly shown and described with reference to the preferred embodiments thereof, it will be understood by those skilled in the art that the foregoing and other changes in form and details can be made therein without departing from the spirit and scope of the invention.

What is claimed is:

1. A card connector into and from which a memory card is detachably inserted and removed, including contacts each adapted to contact a connection portion of the memory card, and a housing for arranging and holding said contacts and having an inserting opening for inserting the memory card,
   wherein said housing comprises two side walls, a rear wall, and a lower wall contiguous to these side and rear walls to form said inserting opening for said memory card by said two side walls, said rear wall, and said lower wall,
   wherein a conductive shell is arranged on the side walls of said housing opposite from said lower wall, and an elastically deformable tray is arranged on said lower wall so as to be slidable with the aid of a metal tray restraining plate which is attached to said lower wall and having a groove,
   wherein said tray comprises an anchoring portion for receiving in said groove, erroneous fitting preventing means having a bending portion and positioning means having an engaging projection for said memory card,
   wherein a width of the tray is less than or equal to about 0.2 times the width of the overall card connector, and wherein a thickness of the overall card connector is less than about 1.8 mm.

2. The card connector as set forth in claim 1, wherein said tray is made of a metal having an elasticity in the form of a plate and comprises at one free end an operating portion extending from the end face of said lower wall.

3. The card connector as set forth in claim 1, wherein said tray is formed as a plate-shaped piece so that a space is provided below a lower surface of said memory card when said tray has been drawn from the housing.

4. A card connector into and from which a memory card is detachably inserted and removed, the card connector comprising:
- at least one contact adapted to contact a connection portion of the memory card;
- a housing for arranging and holding said at least one contact and having an inserting opening for inserting the memory card, wherein said housing includes:
  - two side walls;
  - a rear wall; and
  - a lower wall contiguous to these side and rear walls to form said inserting opening for said memory card by said two side walls, said rear wall, and said lower wall;
- a conductive shell arranged on a first side of said housing opposite from said lower wall;
- a metal tray restraining plate being attached to said lower wawll and having a groove; and
- an elastically deformable tray arranged on said lower wall so as to be slidable with the aid of the tray restraining plate, the tray including:
- an anchoring portion for receiving in said groove;
- erroneous-fitting-preventing means having a bending portion;
- and positioning means having an engaging projection for said memory card;
  - wherein a maximal horizontal width of the tray, including the erroneous-fitting-preventing means and positioning means, is less than or equal to about 0.2 times the maximal horizontal width of the overall card connector; and
- wherein a maximal vertical thickness of the overall card connector, including the housing, the shell, and the tray, is less than about 1.8 mm.

5. The card connector as set forth in claim 4, wherein said tray is made of a metal having an elasticity in the form of a plate and comprises at one free end an operating portion extending from the end face of said lower wall.

6. The card connector as set forth in claim 4, wherein said tray is formed as a plate-shaped piece so that a space is provided below a lower surface of said memory card when said tray has been drawn from the housing.

7. A card connector into and from which a memory card is detachably inserted and removed, including contacts each adapted to contact a connection portion of the memory card, and a housing for arranging and holding said contacts and having an inserting opening for inserting the memory card,
- wherein said housing comprises two side walls, a rear wall, and a lower wall contiguous to these side and rear walls to form said inserting opening for said memory card by said two side walls, said rear wall, and said lower wall,
- wherein a conductive shell is arranged on the side walls of said housing opposite from said lower wall, and an elastically deformable tray is arranged on said lower wall so as to be slidable with the aid of a metal tray restraining plate which is attached to said lower wall and having a groove, and
- wherein said tray has a lateral width being about one-fifth or less than that of the connector and comprises an anchoring portion for receiving in said groove, erroneous fitting preventing means having a bending portion and positioning means having an engaging projection for said memory card.

8. The card connector as set forth in claim 7, wherein said tray is made of a metal having an elasticity in the form of a plate and comprises at one free end an operating portion extending from the end face of said lower wall and the movement of said tray is restricted by the tray restraining plate so that the tray is not lost.

9. The card connector as set forth in claim 7, wherein said tray is formed as a plate-shaped piece so that a space is provided below a lower surface of said memory card when said tray has been drawn from the housing so as to ease taking out the memory card.

* * * * *